July 28, 1964   W. L. LINDLEY   3,142,326
WHEEL RIM ATTACHMENT FOR A TUBELESS TIRE
Filed Nov. 6, 1961
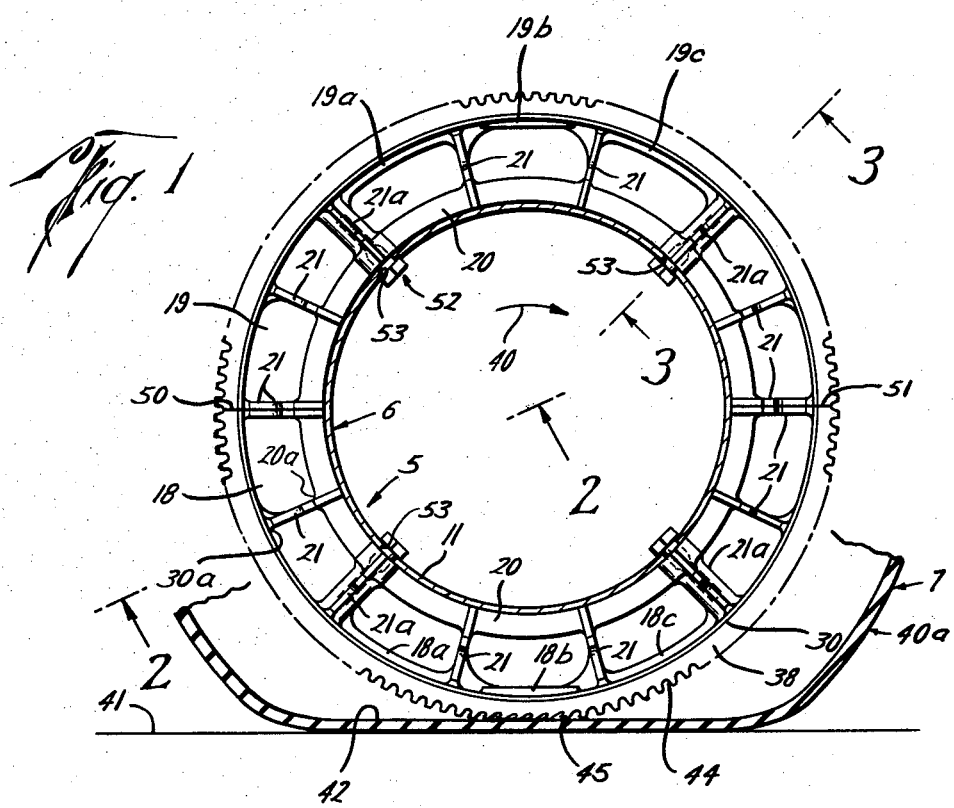
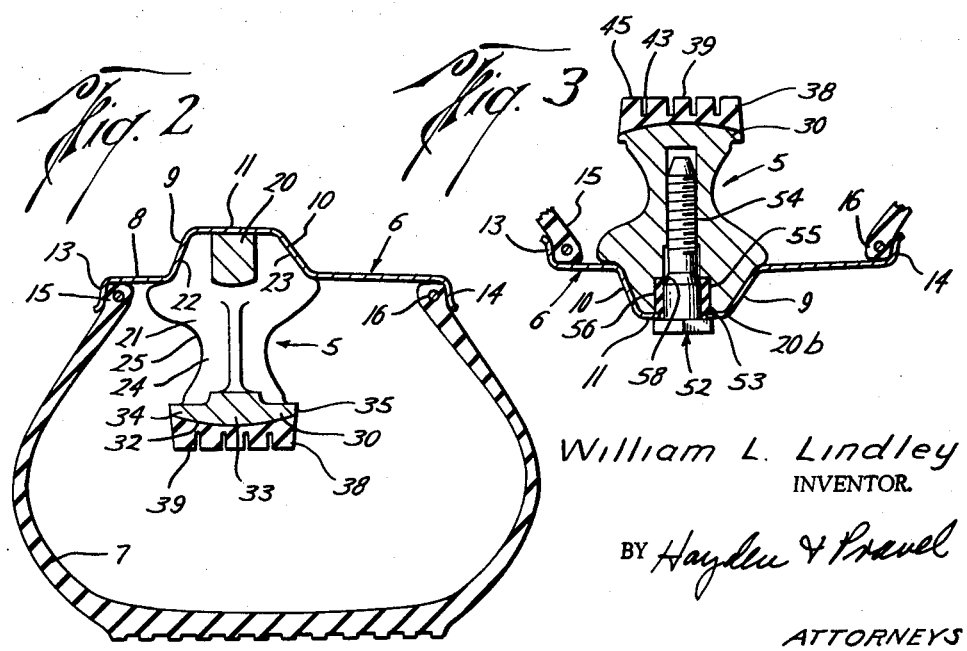
William L. Lindley
INVENTOR.
BY Hayden & Pravel
ATTORNEYS

United States Patent Office 3,142,326
Patented July 28, 1964

---

3,142,326
WHEEL RIM ATTACHMENT FOR A TUBELESS TIRE
William L. Lindley, P.O. Box 12013, Houston 17, Tex.
Filed Nov. 6, 1961, Ser. No. 150,262
2 Claims. (Cl. 152—158)

The present invention relates to a device adapted to be secured to a wheel rim to support a deflated tubeless tire on the wheel in a manner so as to inhibit damage thereto during the continued rotation of the wheel and deflated tire over a surface. More particularly, the invention relates to an improvement in my prior invention in U.S. Letters Patent 2,986,189 on May 30, 1961.

The above patent describes and relates to a device which may be mounted on a drop center wheel rim and discloses a structure therein which may be quickly and easily positioned on a wheel rim of the drop center type to provide a tubeless tire support which is structurally sound. However, it has been found that when a tire deflates on a rim and as the rim continues to rotate, the deflated tire will tend to "bunch up" immediately in front of the wheel on the surface that the wheel is rotating.

Heretofore, the failure to conceive of satisfactory means for safely seating or passing off this "bunched up" portion of deflated tire around the wheel rim and between the wheel rim and the surface on which the wheel rim is rotating has caused great difficulty in that unless this material is properly fed between the wheel rim and the surface on which the rim is seating, the tire will be destroyed almost immediately.

Also, it is desirable to provide a construction of a support for a tubeless tire so that the tire will be supported properly even as the wheel is turned or passes over irregular surfaces during movement of the vehicle.

Additionally, it is necessary in a construction of this type to displace a minimum amount of the air volume in the tubeless tire when the device is initially positioned in the tubeless tire, and the tubeless tire thereafter inflated. This insures proper performance of the tire while still providing a very comfortable ride.

An object of the present invention is to provide an improved form of wheel rim attachment for a tubeless tire which is adapted to receive and support the tubeless tire when it is deflated and to provide a means whereby the tubeless tire may be properly fed around the rim as the rim is rotated during movement of the vehicle.

Still another object of the present invention is to provide a construction of a wheel rim attachment for a tubeless tire which eliminates a minimum air volume from the tubeless tire when it is positioned therein, but which is sturdy in construction so as to withstand the rigors a device of this type will normally encounter.

Still another object of the present invention is to provide a surface on a wheel rim attachment for tubeless tires to function as a safety rim to space the tubeless tire from the wheel rim when it is deflated and which also functions as a moving surface to aid in properly accommodating movement of the deflated tire between the wheel rim and the earth's surface as the wheel rim rotates.

Other objects and advantages of the present invention will become more readily apparent from a consideration of the following description and drawings wherein:

FIG. 1 is a sectional view showing the present invention in its preferred embodiment mounted on a wheel rim and illustrating the flexible or moving surface adjacent the inner periphery of the deflated tire to aid in flowing or moving it along the surface on which the wheel is rotated;

FIG. 2 is a sectional view on the line 2—2 of FIG. 1 to illustrate the details of the construction of the invention shown therein and particularly the arrangement of the resilient means on which the deflated tire is supported; and FIG. 3 is a sectional view on the line 3—3 of FIG. 1 and shows the securing means for securing the semicircular portions of the present invention in place on the drop center rim and a seal means for positively sealing the semicircular portions in position on the wheel rim to inhibit leakage of air from the tubeless tire.

Attention is first directed to FIG. 1 of the drawings wherein the invention is represented generally by the numeral 5 and is shown as being positioned on a rim 6 which in turn supports the tubeless tire represented by the numeral 7.

As better seen in FIG. 2 of the drawings, the rim 6 is the drop center type wherein the central portion of the rim extends circumferentially and annularly inwardly towards the center of the wheel and relative to the circumferential edge 8 of the rim. The inwardly extending portion is integrally formed in the circumferential edge 8 and includes the two continuous side portions 9 and 10 which are joined by the portion 11. The outer annular edge 5 of the circumferential surface 8 projects outwardly from the center of the wheel and relative to the surfaces 9 and 10, as shown at 13 and 14, and provide means against which the edges 15 and 16 of the tubeless tire 7 are supported and retained after the tubeless tire is inflated.

The device designated generally by the numeral 5 in FIG. 1 is represented by the same numeral in the sectional views in FIGS. 2 and 3, and as shown in FIG. 1 of the drawings, the device 5 includes the two semicircular portions 18 and 19. When the two semicircular portions 18 and 19 are positioned on the wheel rim 6 as shown in FIG. 1 of the drawings, a continuous annular or circular arrangement is provided for supporting and aiding in moving the tubeless tire 7 on the ground when it is deflated, as will be described in greater detail hereinafter.

Each of the semicircular portions 18 and 19 include an inner semicircular member 20 as shown in FIG. 1 of the drawings. Circumferentially spaced on the semicircular member 20 of each portion 18 and 19 is a plurality of radially extending projections 21. The projections 21 extend laterally and radially relative to the member 20, and as better illustrated in FIGS. 2 and 3, include the edge surfaces 22 and 23 which conform and fit the surfaces on portions 9 and 10 of the drop center rim 6.

It will be noted as seen in FIGS. 2 and 3 that the center portion 24 of the projections 21 is cut away as illustrated at 25. This construction along with the other construction of the semicircular portions 18 and 19 provide a device of maximum strength but which reduces the volume of the air in the tubeless tire a minimum amount when it is positioned within the tire as shown in FIG. 1 of the drawings.

Connected to the outer edge of the projections 21 is a second or outer semicircular member 30, and as illustrated in FIG. 3 of the drawings, the inner semicircular member 20, projections 21, and outer semicircular member 30 of each portion 18 and 19 may be integrally formed if desired.

Generally speaking, the projections 21 are formed or flat plate material as illustrated in FIG. 1 of the drawings, which is enlarged slightly at its point of juncture with the inner member 20 and outer member 30 as illustrated at 20a and 30a, respectively.

The outer circumferential surface 32 of the member 30 is constructed so that its thickest portion is adjacent the center thereof as illustrated at 33, and it reduces in dimension in cross-sectional view as illustrated at 34 and 35. Bonded on the surface 32 on each semicircular portion 18 and 19 is resilient material 38, the resilient material 38 having its outer surface 39 substantially flat in cross-section as seen in FIGS. 2 and 3. The resilient material 38 provides a means for inhibiting damage to the tubeless tire 7 when it is deflated and engages the device 5 of the present invention.

This feature is better illustrated in FIG. 1 of the drawings wherein the present invention is illustrated as being mounted on the nondriving wheel of a vehicle. When a tubeless tire becomes deflated and as the wheel continues to rotate, as represented by the arrow 40 in FIG. 1 of the drawings, a portion of the tubeless tire normally tends to collect or "bunch up" immediately in front of the wheel and adjacent the surface 41 along which the wheel is moving.

The "bunched up" portion of the tubeless tire 7 tends to drag on the surface 41 and is difficult to feed around the wheel rim as the wheel rotates. As a practical matter, the friction or resistance to rotation caused by the "bunched up" portion will cause a tire to heat up and tear up substantially immediately if continued rotation of the wheel is tried over an extended period. In FIG. 1, the deflated tubeless tire is represented by the numeral 40a, and it will be noted that there is not any "bunched up" portion on the deflated tire 40a. The present invention overcomes the problem hereinabove discussed in that the resilient means 38 bonded on the outer or second semicircular member 30 is constructed and arranged so that it will flex, flow, or move as it engages the inner periphery 42 of the deflated tire 40a and thereby aid in continuously feeding the deflated tire 40a around the wheel rim in a manner so as to inhibit damage thereto. This is illustrated in FIG. 1 of the drawings, and it will be noted that as illustrated in the drawings, the resilient means 38 is shown as being provided with circumferentially extending grooves 43 and laterally extending grooves 44 extending through resilient means 38 which provide the resilient means 38 with alternate projections 45 that are separated by the grooves 43 and 44 that extend completely around the resilient means 38. The grooves and projections may be formed by a tread design other than that shown in the drawings, if desired.

I have discovered that when a resilient means 38 is provided with a surface configuration wherein alternate projections and grooves or spaces are provided therein, movement of a deflated tubeless tire around the wheel rim will be accommodated as the tubeless tire 7 engages the surface 41 upon which it is moving in a manner so that the tubeless tire 40a is fed around the wheel rim in a manner to inhibit damage thereto.

Apparently, the resilient means 38, and more particularly, the projections 45 and groove arrangement provide a continuously moving or flexing surface which aids in "passing off" or feeding the tubeless tire 40a around the wheel rim 6 as it rotates.

Also, the resilient means 38 serves as a cushion to prevent damage to the interior of the tubeless tire 7, and the arrangement of the projections and grooves in the resilient means 38 provides, by reason of its movement, a means for inhibiting friction in the tire, thus retarding or eliminating heating of the tire.

This construction permits a tubeless tire to be driven for a substantial period of time even after it has been deflated so that even if the vehicle is in a remote area when the tubeless tire deflates, it may be safely driven to the next service station before repair is facilitated.

It is to be noted that the semicircular portions 18 and 19 are secured on the drop center rim 6 by suitable means so that escape of air from the tubeless tire 7 is inhibited. When the semicircular portions 18 and 19 are presented on the drop center rim 6, the projections 21 at the end of each of the portions 18 and 19 will abut as represented by the numerals 50 and 51 in FIG. 1 of the drawings. In order to secure the portions 18 and 19 on the drop center rim in a manner to inhibit leakage of air from the rim, bolt means as illustrated generally by the numeral 52 may be employed.

It is to be noted that the bolt means are arranged at an angle of 90° relative to each other, and in order to accommodate such bolt means, an opening 53 is provided in the portion 11 of the drop center rim 6 at suitably spaced circumferential intervals, and a threaded opening 54 is formed in each of the portions 18 and 19 so as to conform or mate with the openings 53 arranged in the rim 6. The threaded openings 54 in each of the portions 18 and 19 are provided by enlarging four of the projections as represented by the numerals 21a, such projections being enlarged sufficiently to provide for the threaded opening 54 therein. It is to be noted that the threaded opening 54, as illustrated in FIG. 3 of the drawings, is counterbored as illustrated at 55 whereby a resilient bushing 56 may be placed therein. When the bushing 56 is initially stalled in the counterbore 55, it will extend only to the inner edge 20b of the projection 21 and semicircular member 20. A bolt engages in the threaded opening 54 and is provided with a tapered portion 58 thereon so that as the bolt is seated in the threaded opening 54, the resilient gasket 56 is expanded. As this occurs, the gasket will flow into the opening 53 and seal around the bolt 52 and opening 53 to inhibit leakage of fluid from the tubeless tire 7 positioned on the wheel rim 6.

Further attention is directed to the construction and arrangement of the second semicircular member 30 and the resilient means 38 thereon in that the contoured surface 32 enables the resilient means 38 to maintain proper contact with the tubeless tire 7 when deflated even as the tubeless tire 7 is turned or as the tubeless tire 7 moves on inclined or over irregular surfaces 41.

It may be desirable to strengthen each of the portions 18 and 19, and in this regard, it will be noted that the center portions 18a, 18b, and 18c of the portion 18 and the center portions 19a, 19b, and 19c of the semicircular portion 19 are somewhat thickened along the second semicircular member 30 in the central portion thereof. This provides additional strength to the present construction while reducing the air volume in a tubeless tire in a minimum amount.

The present invention has been found entirely satisfactory in commercial use, and it has been discovered that when a resilient means 38 is provided with an irregular surface including alternate projections and grooves thereon in the manner such as illustrated herein, then a tubeless tire is properly fed around the rim as the wheel rotates.

The present invention is shown and described as being mounted on a drop center rim; however, it can be appreciated that this construction may also be employed on a flat center rim without departing from the scope of the present invention.

Broadly, the present invention relates to a support arrangement for supporting a deflated tubeless tire, and more particularly, to a means whereby the deflated tire may be properly engaged and supported as the tire is rotated so as to inhibit dmage to the tire.

What is claimed is:

1. A device adapted to be positioned inside a tubeless tire and secured to a wheel rim which supports the tire including,
    (a) two semicircular portions with each portion having a semicircular member with an inner surface extending circumferentially around the wheel rim which fits on the wheel rim,
    (b) each of said members having a plurality of load bearing radially and laterally extending spaced projections extending from the outer surface of each of said members,
    (c) each of said portions having a second semicircular member surrounding each of said members and connected with the outer end of said projections,
    (d) said second semicircular members each having a continuous circumferential edge which is wider than said semicircular members, (e) said circumferential edge being thicker at its mid portion than along either edge to form a surface which is arcuate in cross-section, (f) a continuous resilient element bonded on said circumferential edge, (g) said resilient element having a surface thereon formed by spaced grooves extending across the surface to form areas of projections separated by grooves which extend across the surface in said resilient element, (h) said resilient element and second semicircular member upon which it is mounted acting as a safety rim to support the tubeless tire in spaced relation to the rim upon deflation of the tubeless tire, and (i) said areas of projections and said grooves in said resilient element functioning where the deflated tubeless tire engages a surface upon which it is rolling to feed the tubeless tire around and under said resilient element and second semicircular member.

2. The combination recited in claim 1 including means for securing said first named semicircular member of each portion to the rim.

References Cited in the file of this patent

UNITED STATES PATENTS

| | | |
|---|---|---|
| 1,860,362 | Jones | May 31, 1932 |
| 2,986,189 | Lindley | May 30, 1961 |
| 2,989,108 | Gore | June 20, 1961 |

FOREIGN PATENTS

| | | |
|---|---|---|
| 541,988 | Belgium | Aug. 28, 1959 |